United States Patent [19]

Hori et al.

[11] 4,357,913
[45] Nov. 9, 1982

[54] MULTIBLADE PLASTIC FAN

[75] Inventors: Takanobu Hori, Toyotashi; Motoharu Yoshida, Ichinomiyashi, all of Japan

[73] Assignee: Aisin Seiki Kabushiki Kaisha, Kariyashi, Japan

[21] Appl. No.: 137,261

[22] Filed: Apr. 4, 1980

[30] Foreign Application Priority Data

Apr. 7, 1979 [JP] Japan .................................. 54-42132

[51] Int. Cl.³ .............................................. F01P 7/10
[52] U.S. Cl. ................... 123/41.49; 123/41.65; 403/337; 416/241 A
[58] Field of Search ............... 123/41.49, 41.65, 41.66; 416/241 A, 244 R; 403/335, 337

[56] References Cited

U.S. PATENT DOCUMENTS

| 837,767 | 12/1906 | Aims | 403/337 |
|---|---|---|---|
| 2,041,555 | 5/1936 | Lee | 416/134 |
| 2,158,182 | 5/1939 | Goodard | 403/337 |
| 2,212,072 | 8/1940 | Newnham | 416/134 |
| 3,021,049 | 2/1962 | Settle | 416/244 R |
| 3,183,842 | 5/1965 | Sadler et al. | 416/134 |
| 3,307,634 | 3/1967 | Bihlmire | 416/134 |
| 3,415,553 | 12/1968 | Baugh | 403/408 |
| 3,584,969 | 6/1971 | Aiki et al. | 416/132 |
| 3,622,249 | 11/1971 | Hayashi et al. | 416/204 |
| 3,720,481 | 3/1973 | Motta | 416/241 A |
| 3,751,181 | 8/1973 | Hayashi | 416/241 A |
| 4,245,957 | 1/1981 | Savage et al. | 416/135 |

FOREIGN PATENT DOCUMENTS

| 2842986 | 4/1976 | Fed. Rep. of Germany . |
|---|---|---|
| 1234570 | 10/1960 | France ............ 416/241 A |
| 97829 | 1/1940 | Sweden ............ 403/337 |
| 1418236 | 12/1975 | United Kingdom ....... 416/241 A |
| 1435864 | 5/1976 | United Kingdom . |
| 1437352 | 5/1976 | United Kingdom . |

*Primary Examiner*—Craig R. Feinberg
*Assistant Examiner*—W. R. Wolfe
*Attorney, Agent, or Firm*—Oblon, Fisher, Spivak, McClelland & Maier

[57] ABSTRACT

A cooling fan assembly for a powered vehicle, preferably adapted for automotive use, and having a hub and a plurality of radial fan blades made integral therewith and of synthetic and resilient resin material, the assembly being characterized by the provision of externally knurled bushings and a spacer member, the bushings being coinserted in holes in the hub and the spacer member, the spacer member being fixed to the bushings at one end of the bushings and pressed to one side face of the hub.

3 Claims, 7 Drawing Figures

MULTIBLADE PLASTIC FAN

BACKGROUND OF THE INVENTION

1. Field of the Invention

This invention relates to improvement in and relating to a vehicle engine cooling flexible blade plastic fan assembly.

2. Description of the Prior Art

It has been proposed to manufacture the cooling fans from synthetic resin material for prevention of noises occasionally produced by metal blades and for simplicity in flattening the blades so as to increase the degree with an increase in rotational speed of the fan.

Difficulties were encountered, however, in preventing the connection between the plastic hub portion and a driving member from becoming loosened during the life due to the operating environmental temperature-variation therearound with the result that the engine-torque is not effectively transmitted to the fan assembly. This can be usually emphasized in certain applications to a truck engine which usually has the engine cooling fan coupled directly with the engine crank shaft having a higher tendency to conduct heat from the engine to the fan assembly.

It has been already proposed as a counter measure for the above-mentioned conventional drawbacks to employ an annular spacer member and a plurality of bushing, to provide a reliable coupling between the hub and the driving member by commonly passing the bushing, through the hub and the spacer member for bolting the hub portion to the driving member.

Further difficulties were encountered in that the above proposed method has not proven entirely sufficient.

SUMMARY OF THE INVENTION

It is therefore the main object of the present invention to provide an efficient method for coupling the fan with the driving member which is capable of avoiding substantially the aforementioned conventional drawbacks to thereby avoid any tendency of insufficient torque transmission from the driving member to the fan.

Accordingly the invention consists of a fan assembly driven by an output member of an internal combustion engine of automotive vehicles comprising a hub portion formed of molded plastic, a plurality of blades extending radially outwardly from the hub portion and a boss projecting radially inwardly from the hub portion having a plurality of axial holes, the blades and the boss being made integral with the hub portion, an annular spacer member having a plurality of axial holes, a plurality of bushings inserted in the holes of the boss and in the holes of the spacer member, the spacer member being fixed integrally to the bushings, each of the bushings having a flange at one end thereof interposed between one side of the boss and the output member, an outwardly deformed portion at the other end thereof engaging the other side of the boss, and a knurled portion over at least part of the outer periphery thereof for engaging the bore of the holes of the boss, the flange of the bushings and one side of the boss clamping therebetween the spacer member, and a plurality of bolts passing through the output member and the bushings for securing the hub portion to the output member.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
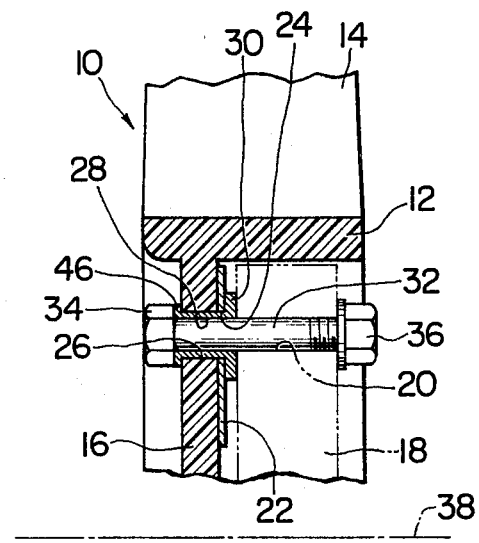
FIG. 1 is a portion of a longitudinal cross-sectional view of a fan assembly according to the invention.

Referring to FIG. 1, numeral 10 denotes generally a fan assembly according to the invention having a hub portion 12. The hub portion 12 is provided with a plurality of blades 14 extending radially outwardly therefrom and is also provided with a boss 16 projecting radially inwardly therefrom. All of the hub portion 12, the blades 14 and the boss 16 are formed of molded plastics and are made integral with each other. An output member 18 of the fluid coupling is located in the hub portion 12 and is provided with a plurality of circumferentially arranged axial holes 20. An annular spacer member 22 with a corresponding number of circumferentially spaced axial holes 24 is disposed in abutment with the right face of the boss 16. The boss 16 is also provided with a corresponding number of circumferentially arranged axial holes 26. The holes 26, 24, and 20 are disposed coaxially with each other.

Figure 2:
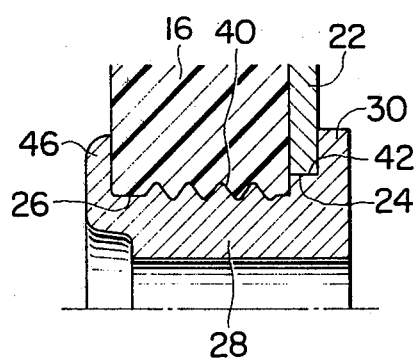
FIG. 2 is an enlarged view of the portion in FIG. 1.

A bushing 28 is firmly inserted in each of the holes 26 of the boss 16 and each of the holes 24 of the spacer member 22 and is provided with an annular flange 30 extending radially outwardly from the right end interposed between the right face of the spacer member 22 and the left side of the output member 18. The left end of the bushing 28 is deformed as indicated by reference numeral 46 to engage with the left side face of the boss 16 as best shown in FIG. 2. The spacer 22 is thus fixedly interposed between the boss 16 and the flange 30 of the bush 28.

A bolt 32 having a head 34 at the left end thereof is passed through the hole 20 of the output member 18 and the bushing 28 from the left to the right, and the right end of the bolt 32 is engaged with a nut 36. The fan assembly 10 is thus coupled with the fluid coupling or the output member 18 to be together rotated around a rotational axis shown in phantom in FIG. 1 by the dashed and dotted line 38.

As best shown in FIG. 2, the bush 28 has formed on the external face a knurled portion 40 in order that a better firm connection may be provided between the bushing 28 and the boss 16. In the knurled portion, there are formed a series of small ridges and a series of small dents alternated with each other. The bushing 28 is also provided with a non-knurled portion 42 between the knurled portion and the flange 30 as will be seen in FIG. 2. The axial length of the non-knurled portion 42 is set substantially identical with a thickness of the spacer member 22.

In inserting the bushing 28 in the hole 26 of the boss 16, the temperature of the bushing 28 is maintained above the melting point of the plastic, so that the bushing 28 is fixedly connected to the boss 16 because the periphery of the hole 26 of the boss 16 is molten and the dents in the knurled portion 40 are filled with plastic. In other words, the knurled portion 40 bites into the boss 16. Accordingly, once the bushing 28 is inserted in the hole 26 of the boss 16 in such a manner that a connecting force is exerted between the boss 16 and the bushing 28 to prevent a loosened connection between the boss 16 and the bushing 28 upon environmental thermal-variation around the fan assembly 10 or upon vibration of the bushing 28 caused by the engine.

One of the methods for melting the periphery of the boss hole 26 is to heat the bushing 28 over the melting point of plastic before insertion of the bushing 28. Another method is to transmit the ultrasonic wave to the periphery of the boss hole 26 during insertion of the bushing 19. It should be noted that the marginal non-knurled portion 42 of the bushing 28 is shrinkage fitted in the hole 24 in the annular spacer member 22 to thereby provide a firm tightened connection between the spacer member 22 and the bushing 28.

Figure 3:
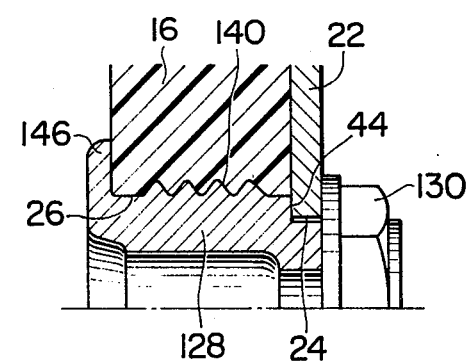
FIG. 3 is a view similar to FIG. 2 but showing a first modified embodiment of the invention.

In FIG. 3 is shown another embodiment of the invention. The bushing 128 has at one end portion thereof an annular shoulder 44 and a threaded portion outside of the shoulder 44. A nut 130 is screwed on the threaded portion so as to press the spacer member 22 on the shoulder 44 to thereby tightly clamp the spacer member 22 between the shoulder 44 and the nut 130. In FIG. 3, similar parts to those in FIGS. 1 and 2 are shown by similar numerals in 100 series. Further description is therefore considered unnecessary in order that the second embodiment may be understood.

Figure 4:
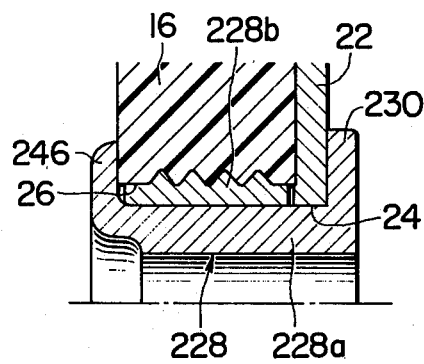
FIG. 4 is a view similar to FIG. 3 but showing a second modified embodiment of the invention.

In FIG. 4 is shown still another embodiment of the invention. Similar parts to those in FIGS. 1 and 2 are shown by the same numerals in 200 series for understanding that embodiment. The bushing 228 is separated into an inner portion 228a and an outer portion 228b for easy assembly of the fan. The inner portion 228a having a flange 230 at the right end is passed through the outer portion 228b and the left end of the inner portion 228a is outwardly deformed as shown at 246. The inner portion 228a of the bushing 228 is by numeral the marginal portion shrinkage fitted in the hole 24 of the spacer member 22.

Figure 5:
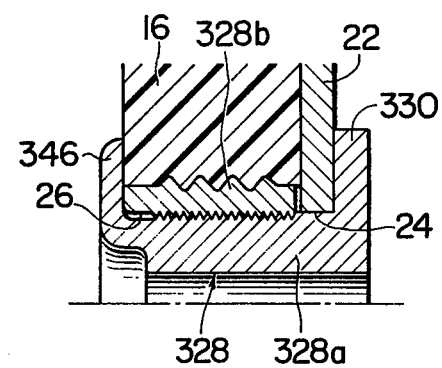
FIG. 5 is a view similar to FIG. 4 but showing a third modified embodiment of the invention.

In FIG. 5 is shown still yet another embodiment of the invention. The inner portion 328a of the bushing 328 is screwed in the outer portion 328b in order to interconnect each other. The spacer member 22 is gripped between the right end of the outer portion 328b and the flange 330 in the same manner as that of FIG. 4.

Figure 6:
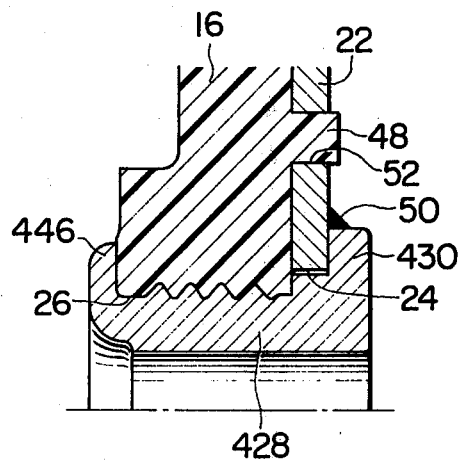
FIG. 6 is a view similar to FIG. 5 but showing a fourth modified embodiment of the invention.
Figure 7:
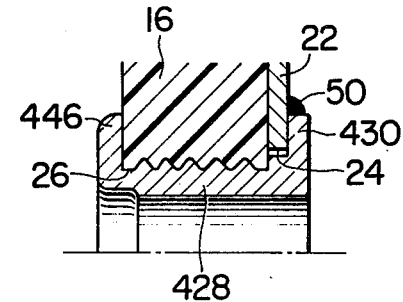
FIG. 7 is a view similar to FIG. 6 but showing a fifth modified embodiment of the invention.

In FIGS. 6 and 7, the spacer member 22 may be connected to the bushings 428 at the flange 430 thereof by means of welding as shown by reference numeral 50 by the solid black lining. Further, the spacer 22 may additionally couple with the boss 16 by fitting a projection 48 of the boss 16 in the corresponding aperture 52 of the spacer member 22, as shown in FIG. 6.

In FIGS. 5, 6 and 7, similar parts to those in FIGS. 1 and 2 are shown by the same numerals as those in FIGS. 1 and 2 in 300 series and 400 series, respectively. As thus far described, the fan assembly 10 to which engine-torque be effectively transmitted may be obtained by the bush having the knurled portion thereon.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiblade fan assembly driven by an output member of an internal combustion engine of an automotive vehicle comprising:
    a hub portion formed of molded plastic;
    a plurality of blades extending radially outwardly from said hub portion;
    a boss projecting radially inwardly from said hub portion and having a plurality of axial holes formed therein, said blades and said boss being integral with said hub portion;
    an annular spacer member having a plurality of axial holes formed therein;
    a plurality of bushings inserted in said holes of said boss and also in said holes of said spacer member, said spacer member being integrally fixed to said bushings, wherein each of said bushings further comprises a flange at a first end thereof interposed between one side of said boss and said output member, an outwardly deformed portion at a second end thereof for engaging the other side of said boss, and a knurled portion over at least part of the outer periphery thereof for engaging the bore of said holes of said boss, wherein said spacer member is interposed between said flange of said bushing and one side of said boss and wherein said spacer member further comprises a spacer member integrally fixed to said bushings by means of shrinkage fitting on said bushings; and
    a plurality of bolts passing through said output member and said bushings for securing said hub portion to said output member.

2. A multiblade fan assembly driven by an output member of an internal combustion engine of an automotive vehicle comprising:
    a hub portion formed of molded plastic;
    a plurality of blades extending radially outwardly from said hub portion;
    a boss projecting radially inwardly from said hub portion and having a plurality of axial holes formed therein, said blades and said boss being integral with said hub portion;
    an annular spacer member having a plurality of axial holes formed therein;
    a plurality of bushings inserted in said holes of said boss and also in said holes of said spacer member, said spacer member being integrally fixed to said bushings, wherein each of said bushings further comprises a flange at a first end thereof interposed between one side of said boss and said output member, an outwardly deformed portion at a second end thereof for engaging the other side of said boss, and a knurled portion over at least part of the outer periphery thereof for engaging the bore of said holes of said boss, wherein said spacer member is interposed between said flange of said bushing and one side of said boss; and
    a plurality of bolts passing through said output member and said bushings for securing said hub portion to said output member wherein each of said bushings further comprises a first outer member including said knurled portion and a second inner member including said flange and said outwardly deformed portion, and each of said bushings is shrinkage fitted in said hole of said spacer member to provide a tight connection between said bushings and said spacer member.

3. A fan assembly in accordance with claim 2 wherein, said second member is screw fitted into said outer first member and said spacer member is clamped between one end of said outer first member and said flange by association of said outwardly deformed portion and said outer first member.

* * * * *

UNITED STATES PATENT AND TRADEMARK OFFICE
CERTIFICATE OF CORRECTION

PATENT NO. : 4,357,913

DATED : November 9, 1982

INVENTOR(S) : TAKANOBU HORI ET AL

It is certified that error appears in the above-identified patent and that said Letters Patent is hereby corrected as shown below:

In column 3, line 48, delete "at" and insert therefor --by numeral--;

In column 3, line 49, delete "by numeral" and insert therefor --at--.

Signed and Sealed this

Twenty-fourth Day of May 1983

[SEAL]

Attest:

DONALD J. QUIGG

Attesting Officer

Acting Commissioner of Patents and Trademarks